US008662722B2

(12) United States Patent
Dixon

(10) Patent No.: US 8,662,722 B2
(45) Date of Patent: Mar. 4, 2014

(54) OLED TRIM PANEL

(75) Inventor: Mark E. Dixon, Farmington Hills, MI (US)

(73) Assignee: Magna International Inc., Aurora (CA)

( * ) Notice: Subject to any disclaimer, the term of this patent is extended or adjusted under 35 U.S.C. 154(b) by 288 days.

(21) Appl. No.: 12/602,825

(22) PCT Filed: Jun. 5, 2008

(86) PCT No.: PCT/CA2008/001071
§ 371 (c)(1),
(2), (4) Date: Dec. 3, 2009

(87) PCT Pub. No.: WO2008/148199
PCT Pub. Date: Dec. 11, 2008

(65) Prior Publication Data
US 2010/0194767 A1 Aug. 5, 2010

Related U.S. Application Data

(60) Provisional application No. 60/942,071, filed on Jun. 5, 2007.

(51) Int. Cl.
*B60R 13/02* (2006.01)
(52) U.S. Cl.
USPC .......................................... 362/488; 362/489
(58) Field of Classification Search
USPC ........................................ 362/488–492, 487
See application file for complete search history.

(56) References Cited

U.S. PATENT DOCUMENTS

| 6,160,475 | A | * | 12/2000 | Hornung et al. | 340/461 |
| 6,179,453 | B1 | * | 1/2001 | McMahon | 362/490 |
| 6,773,129 | B2 | | 8/2004 | Anderson, Jr. et al. | |
| 7,048,422 | B1 | * | 5/2006 | Solomon | 362/503 |
| 7,198,393 | B2 | | 4/2007 | Tubidis et al. | |
| 7,237,933 | B2 | * | 7/2007 | Radu et al. | 362/488 |
| 7,780,322 | B2 | * | 8/2010 | Muller et al. | 362/492 |
| 2006/0119705 | A1 | | 6/2006 | Liao | |

FOREIGN PATENT DOCUMENTS

| DE | 202005014791 U1 | | 12/2005 |
| EP | 1688308 | | 8/2008 |
| GB | 2405755 A | * | 3/2005 |
| WO | 2004069578 | | 8/2004 |

* cited by examiner

*Primary Examiner* — Robert May
(74) *Attorney, Agent, or Firm* — Honigman Miller Schwartz and Cohn LLP

(57) ABSTRACT

An interior trim component for a vehicle includes a trim panel. The trim panel includes a substrate layer, a protective layer, and an organic light emitting diode portion disposed between the substrate layer and the protective layer for displaying one or more surface appearances on the trim panel within a passenger compartment of the vehicle. A method for forming and operating an interior trim component is also disclosed.

19 Claims, 6 Drawing Sheets

OLED TRIM PANEL

This application is a National Stage Entry of PCT/CA2008/001071 filed on Jun. 5, 2008. PCT/CA2008/001071 claims the benefit of U.S. Provisional Application 60/942,071 filed on Jun. 5, 2007, now expired. The disclosures of these prior applications are considered part of the disclosure of this application and are hereby incorporated by reference in their entirety.

FIELD OF THE INVENTION

The invention relates in general to a trim panel and a method for manufacturing the same.

DESCRIPTION OF THE RELATED ART

In the vehicular art, a trim panel is typically incorporated within the interior of a vehicle and may be found in the passenger compartment area for the purpose of finishing structure of the vehicle in an aesthetically-pleasing manner.

Although conventional trim panels may be suitable for the foregoing intended purpose, there is a need in the art to provide a novel trim panel, a method for making the trim panel and a method for using the trim panel as described herein.

SUMMARY OF THE INVENTION

In accordance with the invention there is provided, an interior trim component for a vehicle, comprising a trim panel including a substrate layer, a protective layer, and an organic light emitting diode portion disposed between the substrate layer and the protective layer for displaying one or more surface appearances on the trim panel within a passenger compartment of the vehicle. In accordance with an aspect of the invention, the one or more surface appearances can be selectively changed from a first surface appearance based upon a first characteristic of the organic light emitting diode portion to one or more second surface appearances based upon one or more second characteristics of the organic light emitting diode portion.

In accordance with another aspect of the invention, the interior trim component further comprises an input/output portion connected to the trim panel, wherein the input/output portion permits a user to selectively change the displayed surface appearance of the interior trim panel.

In accordance with a further aspect of the invention, the interior trim component further comprises an interface connected to the input/output portion, and a processor connected to the interface, wherein the interface is connected to the trim panel.

In accordance with yet a further aspect of the invention, the interior trim component further comprises an input/output port connected to the processor, and an external memory device connected to the input/output port, wherein upon interfacing the external memory device with the input/output port, the user may selectively choose from one or more stored potential surface appearances that are located in the external memory device. In accordance with an embodiment of the invention, the external memory device includes a jump drive or memory of a digital camera.

In accordance with another embodiment of the invention, the input/output port is formed in one or more of a door panel, dashboard and instrument panel located within the passenger compartment of the vehicle. The organic light emitting diode portion includes a non-rigid, flexible substrate base layer, and one or more organic light emitting diode layers deposited upon the non-rigid, flexible substrate base layer. The one or more organic light emitting diode layers can be deposited via screen-printing or ink-jet printing, for example.

Each of the one or more organic light emitting diode layers include a cathode, an anode, and an emissive layer and a conductive layer disposed between the cathode and the anode.

In accordance with another aspect of the invention, the protective layer defines a substantially transparent A-surface of the interior trim panel, wherein the emissive layer includes a plurality of electrons, wherein the conductive layer includes a plurality of positively-charged holes, wherein, upon application of voltage, the one or more organic light emitting diode layers emits radiation having a frequency in the visible region, wherein the radiation to pass through the substantially transparent A-surface of the interior trim panel defined by the protective layer. The radiation can include a color, pattern, design, illustration, picture, or theme.

In accordance with yet another aspect of the invention, the protective layer defines a seal, wherein the seal extends from the protective layer to define a length (T), wherein the substrate layer defines a first thickness (T1), wherein the organic light emitting diode portion defines a second thickness (T2), wherein the length (T) is approximately equal to the first and second thicknesses (T1, T2). The seal extends around a perimeter of the trim panel.

In accordance with a further embodiment of the invention, the interior trim component further comprises an external memory device connected to the processor.

In accordance with another aspect of the invention, the trim panel (10) can include an A-pillar, B-pillar or C-pillar, a door panel or a bolster, and a dashboard, instrument panel or center console.

In accordance with a further aspect of the invention, the substrate layer (12) can include acrylonitrile-butadiene-styrene (ABS), polypropylene (PP), or polycarbonate (PC), and the protective layer can include thermoformed urethane or sprayed urethane.

In accordance with the invention there is further provided, a method for forming an interior trim component for a vehicle, comprising the steps of manufacturing an interior trim panel to be disposed in a passenger compartment of a vehicle by forming a substrate layer, disposing an organic light emitting diode portion upon the substrate layer, disposing a protective layer upon the organic light emitting diode portion and the substrate layer, and providing the interior trim panel with an interface for displaying one or more surface appearances on the interior trim panel within a passenger compartment of the vehicle.

In accordance with an aspect of the invention, the method further comprises the steps of providing the interior trim panel with an input/output portion, connect the interface to the input/output portion, and connecting a processor to the interface, wherein the input/output portion, interface and processor permits a user to selectively change a displayed surface appearance of the interior trim panel from a first surface appearance based upon a first characteristic of the organic light emitting diode portion to one or more second surface appearances based upon one or more second characteristics of the organic light emitting diode portion.

In accordance with another aspect of the invention, the method further comprises the step of interfacing an external memory device connected to an input/output port, and upon interfacing the external memory device with the input/output port, permitting the user to selectively choose from one or more potential surface appearances of the first and one or more second surface appearances that are stored on the external memory device.

In accordance with yet another aspect of the invention, the step of providing the interior trim panel with an input/output portion includes the step of forming the input/output port in one or more of a door panel, dashboard and instrument panel located within the passenger compartment of the vehicle. The forming step includes the step of injection molding the substrate layer as a pre-formed component.

In accordance with a further aspect of the invention, the step of disposing an organic light emitting diode portion step includes the step of forming a non-rigid, flexible substrate base layer, and depositing one or more organic light emitting diode layers deposited upon the non-rigid, flexible substrate base layer.

In accordance with a yet a further aspect of the invention, the depositing one or more organic light emitting diode layers can include the step of screen-printing the one or more organic light emitting diode layers, or the step of ink-jet printing the one or more organic light emitting diode layers.

In accordance with another aspect of the invention, the step of disposing a protective layer includes the step of thermoforming the protective layer upon the organic light emitting diode portion and the substrate layer, or the step of spraying the protective layer upon the organic light emitting diode portion and the substrate layer.

Furthermore, in accordance with the invention there is provided, a method for operating an interior trim component disposed in a passenger compartment of a vehicle, comprising the steps of disposing a trim panel within the passenger compartment of the vehicle, wherein the trim panel includes, a substrate layer, a protective layer, and an organic light emitting diode portion disposed between the substrate layer and the protective layer, wherein the organic light emitting diode portion includes a non-rigid, flexible substrate base layer, and one or more organic light emitting diode layers deposited upon the non-rigid, flexible substrate base layer, applying a voltage to the organic light emitting diode portion, emitting radiation from the one or more organic light emitting diode layers, wherein the emitted radiation includes a frequency in the visible region, and passing the radiation through the protective layer, wherein the radiation provides one or more surface appearances on the interior trim panel within a passenger compartment of the vehicle.

In accordance with an aspect of the invention, the method for operating an interior trim component further comprises the step of interfacing a memory device with the trim panel, and selectively choosing from one or more potential surface appearances that are stored on the memory device.

In accordance with another aspect of the invention, the method for operating an interior trim component further comprises the steps of providing the interior trim panel with an input/output portion, interfacing an external memory device with the input/output portion, and selectively choosing from one or more potential surface appearances that are stored on the external memory device.

In accordance with a further aspect of the invention, the surface appearance can include a color, pattern, design, illustration, picture, or theme.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary trim panel and method for making a trim panel in accordance with various exemplary embodiments of the invention. It is to be generally understood that the nomenclature used herein is simply for convenience and the terms used to describe the invention should be given the broadest meaning by one of ordinary skill in the art.

Figure 1A:
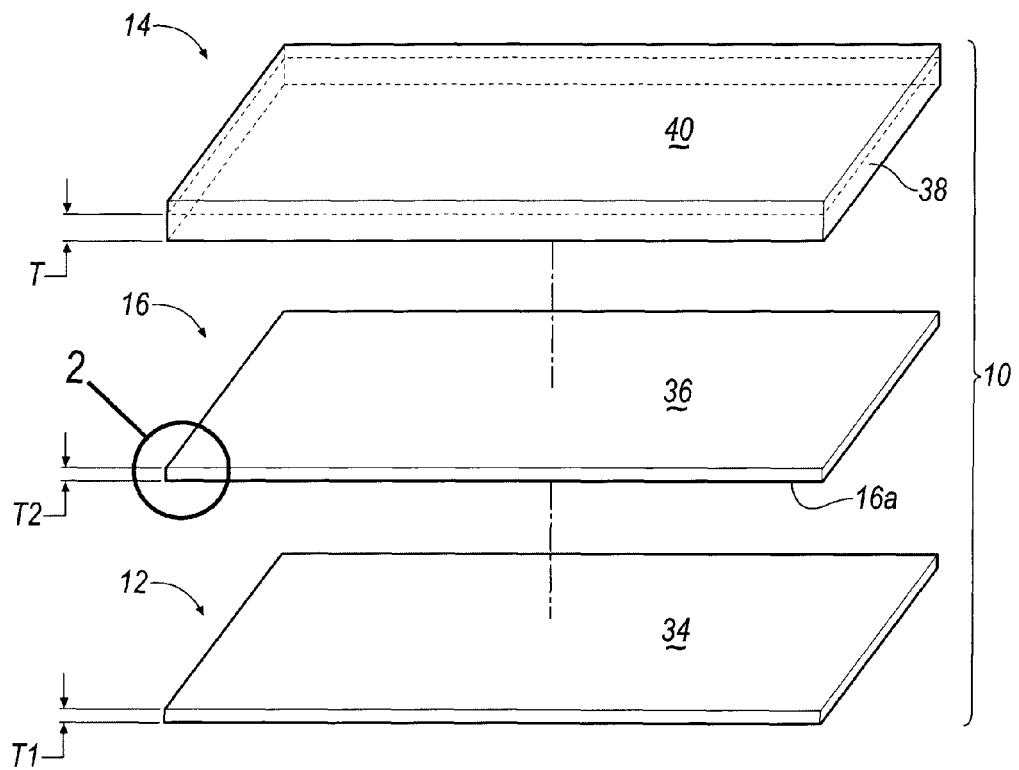
FIG. 1A is an exploded view of a trim panel in accordance with an exemplary embodiment of the invention.
Figure 1B:
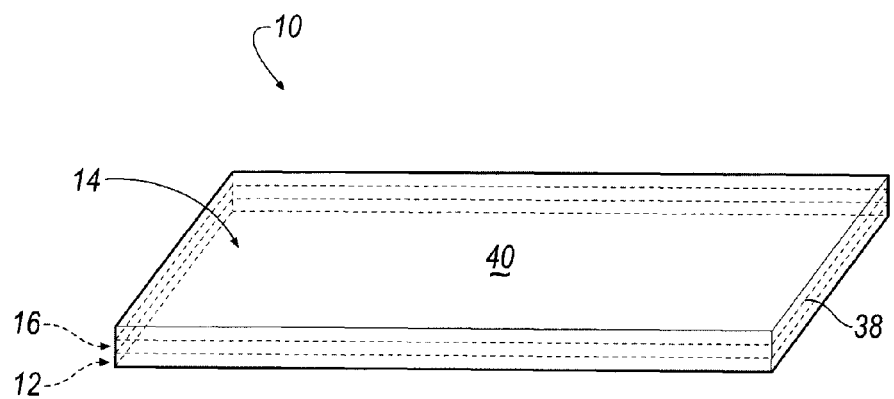
FIG. 1B is a representative view of a trim panel in accordance with an exemplary embodiment of the invention.

Referring to FIGS. 1A and 1B, an exploded view of a trim panel is shown generally at 10 according to an embodiment. In an embodiment, the trim panel 10 may include a plurality of layers, such as, for example, a substrate layer 12, a protective layer 14, and an organic light emitting diode (OLED) portion 16 disposed between the substrate and protective layers 12, 14.

In an embodiment, the substrate layer 12 may include any desirable material, such as, for example, acrylonitrile-butadiene-styrene (ABS), polypropylene (PP), polycarbonate (PC), or the like. In an embodiment, the substrate layer 12 may be a pre-formed component that is formed, for example, by way of injection molding. In an embodiment, the substrate layer 12 may be formed to include any desirable contour/dimension associated with a particular structure and, accordingly, may be application specific. For example, the substrate layer 12 may be formed to include a contour/dimension of pillar trim, such as, for example, an A-pillar, B-pillar, C-pillar, or the like. In an embodiment, the substrate layer 12 may be formed to include a contour/dimension of door trim, including, for example, one or more of a door panel and/or bolster portion. In an embodiment, the substrate layer 12 may be formed to include a contour/dimension of a dashboard, instrument panel, center console or the like (see, e.g., FIGS. 5A-5C). Although pillar, door, and instrument panel/center console trim are disclosed above as contemplated contours/dimensions of the substrate 12, it will be appreciated that the disclosure is not limited to the above trim panels and that the substrate 12 may be formed to include any desirable contour/dimension to define any desirable trim panel.

Figure 2:
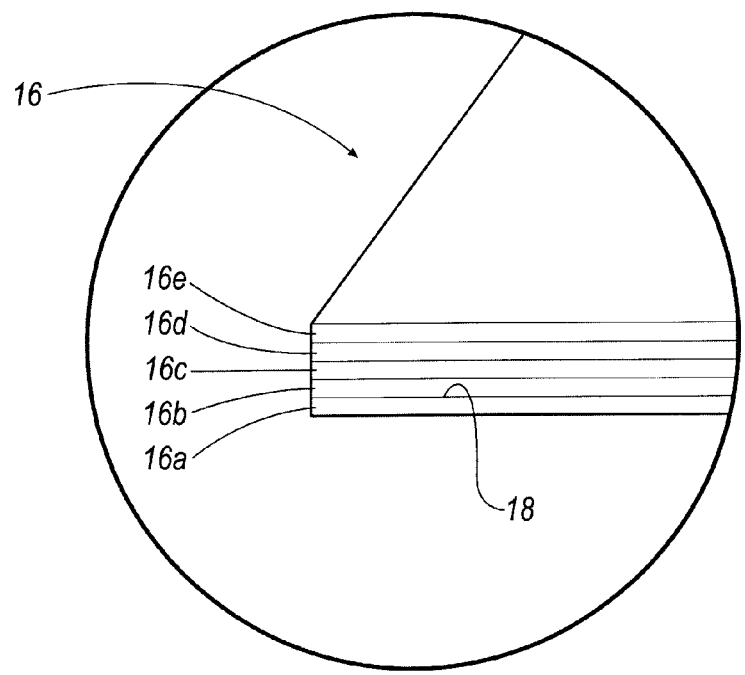
FIG. 2 is an enlarged view of a portion of an organic light emitting diode (OLED) portion in accordance with an exemplary embodiment of the invention.

Referring to FIG. 2, the OLED portion 16 is shown to include five layers, which are identified generally at 16a-16e. Although five layers 16a-16e are shown, it will be appreciated that the OLED portion 16 is not limited to five layers and that the OLED portion 16 may include any desirable number of layers.

According to an embodiment, a base layer is shown generally at 16a, which generally defines a surface, which is shown generally at 18. According to an embodiment, the base layer 16a may include any suitable, non-rigid substrate. According to an embodiment, the base layer 16a is non-rigid and flexible such that when the OLED portion 16 is formed, the OLED portion 16 may conform to the contour/dimension of the substrate 12.

According to an embodiment, a first OLED layer, which is shown generally at 16b, is deposited on the surface 18 utilizing any desirable methodology, such as, for example, printing. According to an embodiment, the first OLED layer 16b may be screen-printed onto the surface 18. Alternatively, if desired, the first OLED layer 16b may be inkjet-printed onto the surface 18. Although screen- and inkjet-printing are disclosed above, it will be appreciated that the disclosure is not limited to screen- and inkjet-printing and that any desirable printing methodology may be utilized to practice the invention. Once the first OLED layer 16b has been deposited, second, third, fourth, or more OLED layers 16c-16e may be deposited there-over the first (and subsequent) OLED layer (s) 16b.

Figure 3:
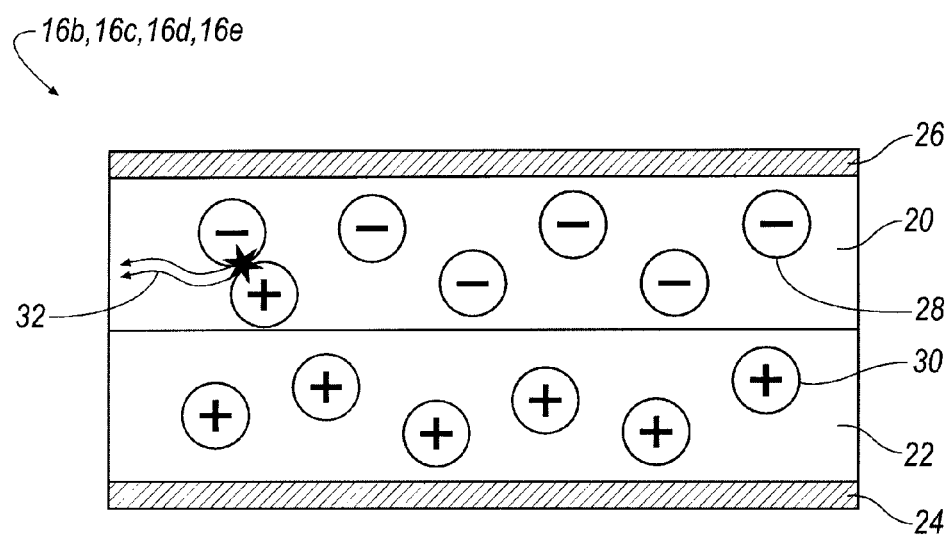
FIG. 3 is a cross-sectional view of an OLED layer of the OLED portion in accordance with an exemplary embodiment of the invention.

Referring to FIG. 3, the OLED layers 16b-16e define an emissive layer 20, a conductive layer 22, an anode 24, and a cathode 26. The emissive and conductive layers 20, 22 generally include organic polymer molecules that conduct electricity (i.e., the layers 20, 22 are organic semiconductors).

Functionally, when a voltage is applied across one or more of the OLED layers 16b-16e, electrons 28 flow from cathode 26 to the anode 24. Soon thereafter, the emissive layer 20 becomes negatively charged while the conductive layer 22 becomes rich in positively charged holes 30. Electrostatic forces bring the electrons 28 and the holes 30 toward each other and recombine. The recombination occurs closer to the emissive layer 20 because organic semiconductor holes 30 are more mobile than electrons. Accordingly, the recombination causes a drop in energy level of electrons 28 that result in an emission of radiation 32 having a frequency in the visible region.

Once the OLED portion 16 is formed, the OLED portion 16 may be secured to a surface 34 (FIG. 1A) of the substrate layer 12. According to an embodiment, the base layer 16a may be secured to the surface 34 utilizing any desirable adhesive. According to an embodiment, the substrate layer 12 and the OLED portion 16 may be pre-formed components that are subsequently molded together in a mold tool. Although adhering and molding are disclosed above, it will be appreciated that the substrate layer 12 and OLED portion 16 may be secured together utilized any desirable procedure. For example and without limitation, in an embodiment, the substrate layer 12 may be injection molded against a pre-formed OLED portion 16.

In an embodiment, once the substrate layer 12 and OLED portion 16 are secured together, the protective layer 14 is provided over a surface 36 of the OLED portion 16. According to an embodiment, protective layer 14 may include any desirable material, such as, for example, urethane, and may be thermoformed or sprayed over the surface 36 of the OLED portion 16.

Referring to FIGS. 1A and 1B, the protective layer 14 may generally define a seal, which is shown generally at 38. In an embodiment, the seal 38 may be integral with and extend away from the protective layer 14. In an embodiment, application of the protective layer 14 also defines the seal 38. According to an embodiment, the seal may extend away from the protective layer 14 to define a length, T, that is approximately equal to the summation of the thicknesses, T1, T2, of the substrate layer 12 and the OLED portion 16, respectively. In an embodiment, the seal 38 may extend around the perimeter of the trim panel 10.

In an embodiment, at least a portion of the protective layer 14 generally defines a surface, which is shown generally at 40. In an embodiment, at least a portion of the surface 40 generally defines an A- or show-surface of the trim panel 10 that may be viewable by passengers in a passenger compartment area of a vehicle (see, e.g., FIGS. 5A-5C). The seal 38 and surface 40 provides an increased degree of protection of the OLED portion 16 from the environment, including protection from liquids, contaminates, and the like.

Figure 4:
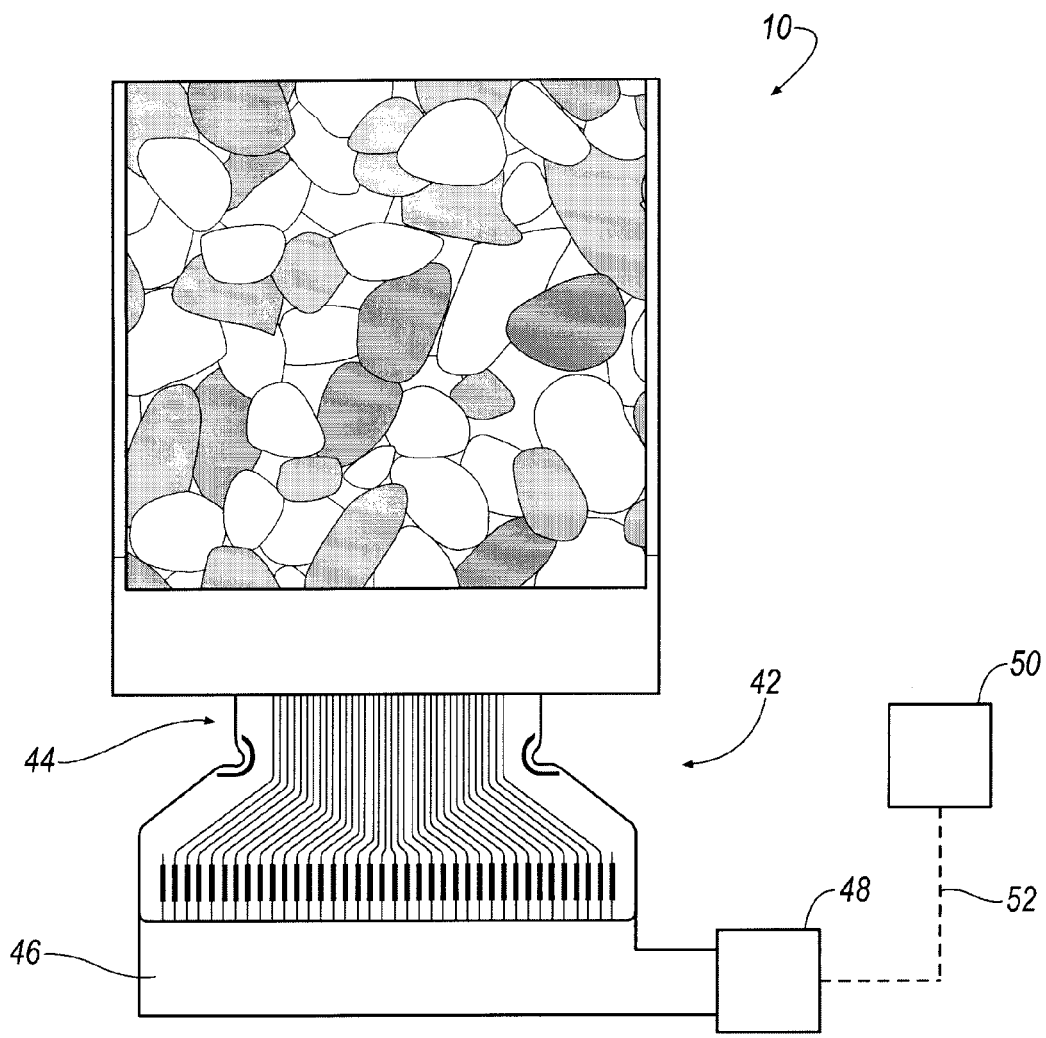
FIG. 4 is a representative view of a system for operating an OLED trim panel in accordance with an exemplary embodiment of the invention.

In an embodiment and as illustrated in FIG. 4, the trim panel 10 includes an interface 42. In an embodiment, the interface 42 provides power as well as a communication conduit to the OLED portion 16 to control the desired pattern of the radiation 32. Other methods of accomplishing same will be recognized by one of ordinary skill in the art and the invention should not be limited to the disclosed embodiment.

According to an embodiment, the interface 42 may provide an input/output portion 44 that interfaces with, for example, a ribbon wire 46. The ribbon wire 46 may connect to a processor 48 that executes instructions and sends output to the OLED portion 16 to control the radiation 32.

The processor 48 may execute instructions, from, for example, a program stored within memory, or, alternatively, from an external memory device 50, such as, for example, a jump drive, digital camera, or the like. The external device 50 may interface with an input/output port 52 formed, for example, in a door panel, dashboard, instrument panel, or the like. Alternatively, the external device 50 may wirelessly communicate information 52 to the processor 48 to provide control over a desired radiation 32.

Figure 5A:
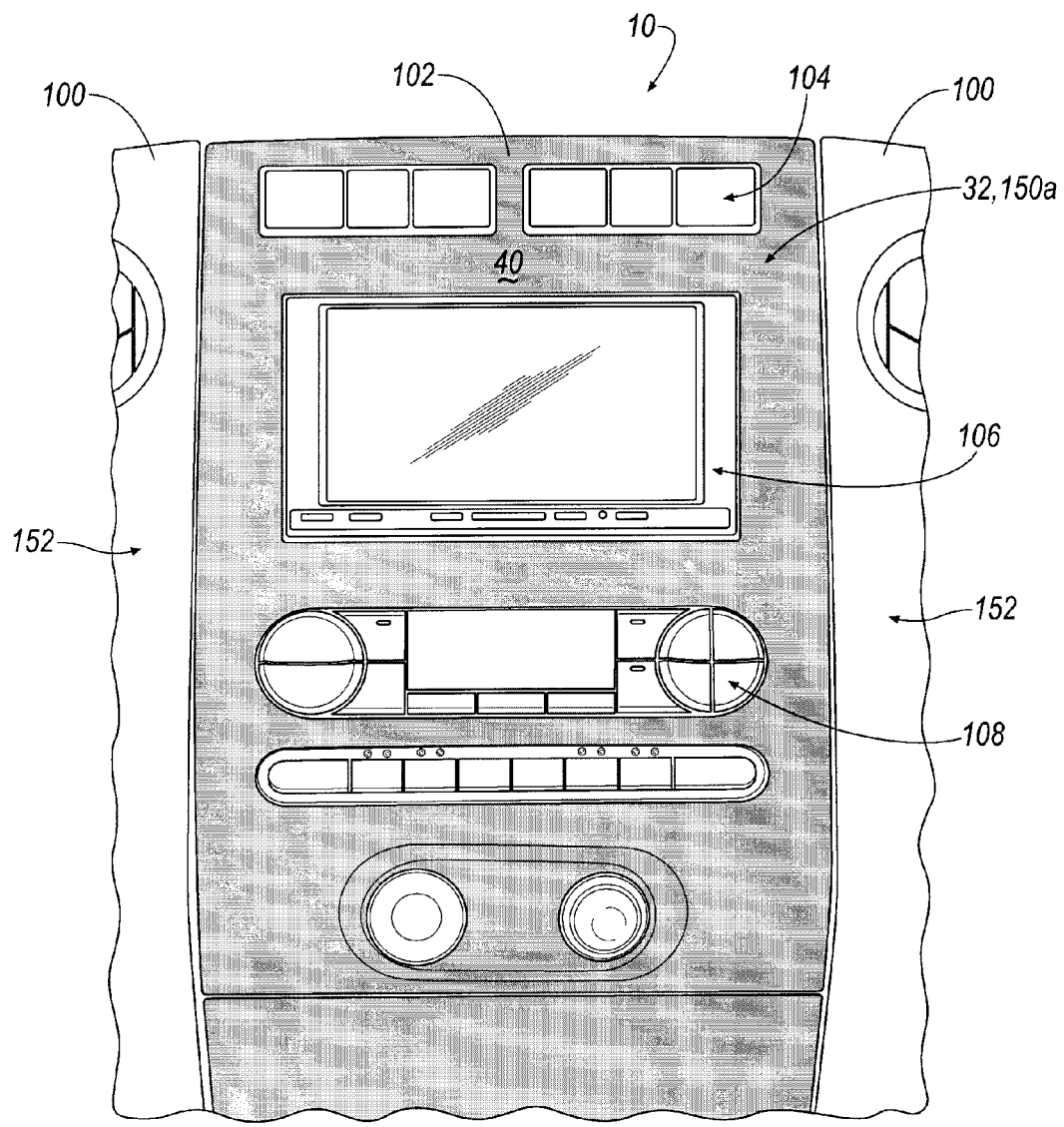
FIGS. 5A-5C each illustrate an environmental view of a trim panel in accordance with an exemplary embodiment of the invention.

In an embodiment and as illustrated in FIG. 5A, the trim panel 10 generally defines a panel that trims a center console 102 associated with an instrument panel 100. The center console 102 may include, for example, heating ventilation and air-conditioning (HVAC) controls 104, a liquid crystal display (LCD) panel 106, audio system controls 108, and the like. With respect to the remainder of this disclosure, the term "center console 102" will be used to reference the trim panel 10 generally discussed hereinabove. It should be recognized that exemplary center console 102 should not be used to limit the trim panel and all examples pertaining to the center console 102 are plausible in other trim panel applications.

In an embodiment and as illustrated, at least a portion of the surface 40 of the protective layer 14 generally defines the A-surface of the center console 102. In an embodiment, the protective layer 14 may be substantially transparent so as to permit the radiation 32 from at least a portion of the OLED portion 16 to be visible by vehicle occupants.

Figure 5B:
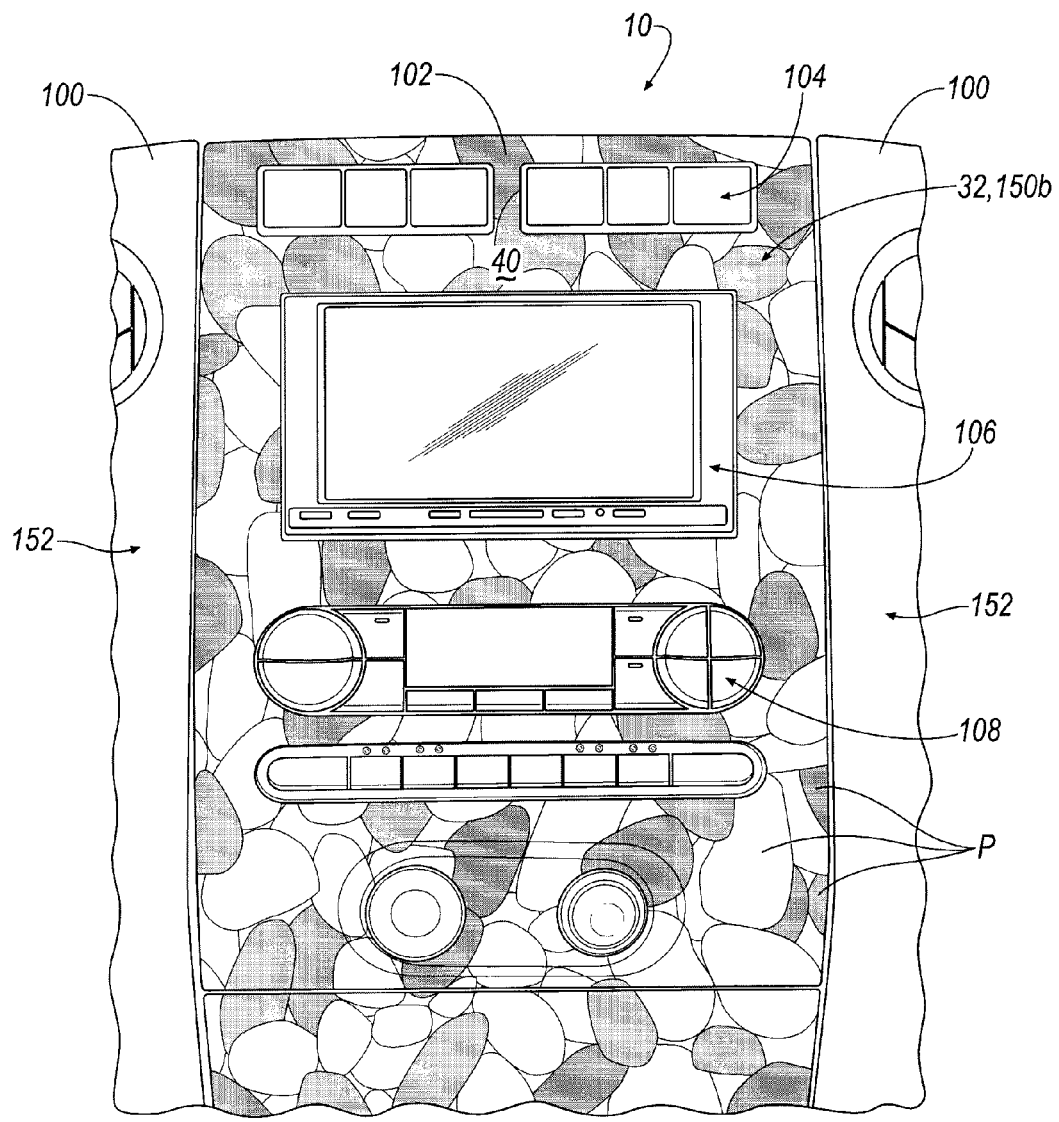
Figure 5C:
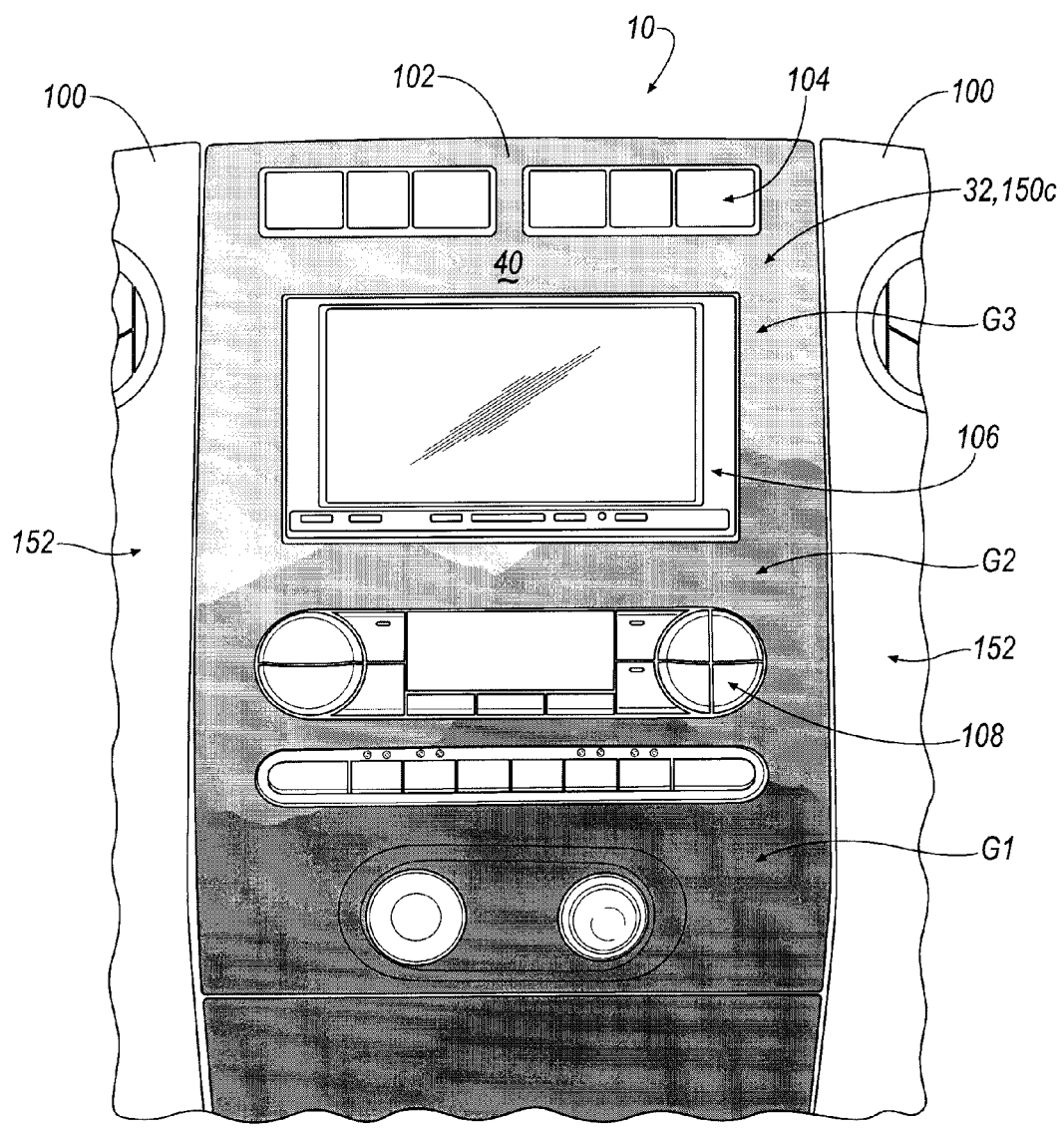

In an embodiment, the processor 48 may execute instructions to control radiation 32 to manipulate the center console 102 to display an output. In an embodiment, the processor 48 may execute instructions to allow the output of the center console 102 to change between multiple potential outputs. For example and referring now to FIG. 5A, one of the outputs may be a single color. In an embodiment, the color may be selectable and changeable based on preferences of the controller or for some other reason. In an embodiment, for example, if the vehicle is operated by different members of a family, a first family member may prefer the center console 102 to have a black color 150a whereas a second family member prefers a pink color 150a. Other exemplary output embodiments are depicted in FIGS. 5B and 5C, which illustrate that the outputs may be a pattern, design, illustration, picture, theme or the like. It will be appreciated that the output should not be limited to the examples disclosed herein and that a broad range of outputs for an OLED device will be recognized by one of ordinary skill in the art.

In an embodiment, the output may be changed in response to a user defined input or a pre-programmed or spontaneous event or condition. In an embodiment and subject to certain pre-requisite hardware, the output may be programmed to alert a user if a door is ajar, if a proximate cell phone is ringing, if an object is located behind the vehicle while the vehicle is reversing, if an engine condition exists or the like.

Accordingly, the trim panel 10 provides an improvement over conventional trim panels in that the aesthetics of the trim panel 10 may be changed according to the desires of the operator. As such, the trim panel 10 may function in a substantially similar manner as a personal computer desktop to provide an image (e.g., a family photo), pattern (e.g. a tropical island), or a theme (e.g., a checkered flag that appeals to a racing enthusiast). In addition, the trim panel 10 may include functionality that provides a message to the vehicle occupants of a condition of the vehicle (e.g., an ajar door), or, a condition of a personal device of the operator (e.g., an incoming cell phone call from the operator's cell phone).

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A vehicular component, comprising:
an interior vehicular trim panel including:
a substrate layer,
a protective layer,
an organic light emitting diode portion disposed between the substrate layer and the protective layer, wherein the protective layer defines an A-surface that extends across all of the interior vehicular trim panel;
a processor coupled to the organic light emitting diode portion that receives information from an external memory device via an input/output port and controls a radiation emitted from the organic light emitting diode based on the information;
wherein all of the A-surface is viewable by one or more passengers in a passenger compartment of a vehicle, wherein the protective layer is substantially transparent for permitting radiation having a frequency in the visible region to pass from the organic light emitting diode portion and through and beyond all of the A-surface, wherein the protective layer defining the A-surface of the interior vehicular trim panel extends across and seals the organic light emitting diode portion while permitting the one or more passengers to view the radiation emitted from organic light emitting diode portion that such that a combination of colors emitted by the organic light emitting diode portion forms a user-selectable surface appearance that is viewable by the one or more passengers in the passenger compartment of the vehicle, the user-selectable surface appearance being based on the information provided from the external memory device and being selectively chosen from one or more potential surface appearances located in the external memory device.

2. The vehicular component according to claim 1, wherein the one or more surface appearances are selectively changeable from a first surface appearance based upon a first characteristic of the organic light emitting diode portion to one or more second surface appearances based upon one or more second characteristics of the organic light emitting diode portion.

3. The vehicular component according to claim 1 further comprising: an input/output portion connected to the trim panel, wherein the input/output portion permits a user to selectively change the displayed surface appearance of the interior trim panel.

4. The vehicular component according to claim 3 further comprising: an interface connected to the input/output portion and the processor.

5. The vehicular component according to claim 4, wherein the input/output port is connected to the processor; and the external memory device selectively attachable to the input/output port.

6. The vehicular component according to claim 5, wherein the input/output port is formed in one or more of a door panel, dashboard and instrument panel located within the passenger compartment of the vehicle.

7. The vehicular component according to claim 1, wherein the organic light emitting diode portion includes a non-rigid, flexible substrate base layer and one or more organic light emitting diode layers deposited upon the non-rigid, flexible substrate base layer.

8. The vehicular component according to claim 7, wherein the one or more organic light emitting diode layers are deposited via screen-printing.

9. The vehicular component according to claim 7, wherein the one or more organic light emitting diode layers are deposited via ink-jet printing.

10. The vehicular component according to claim 7, wherein the emissive layer includes a plurality of electrons, wherein the conductive layer includes a plurality of positively-charged holes, wherein, upon application of voltage, the one or more organic light emitting diode layers emits radiation having a frequency in the visible region that passes through the substantially transparent A-surface of the interior trim panel.

11. The vehicular component according to claim 10, wherein the radiation defines a color, pattern, design, illustration, picture, or theme.

12. The vehicular component according to claim 10, wherein the trim panel extends at least partially across an A-pillar, B-pillar or C-pillar.

13. The vehicular component according to claim 1, wherein the protective layer includes a seal that extends from the protective layer having a defined length, wherein the substrate layer has a first thickness, the organic light emitting diode portion has a second thickness, and wherein the defined length of the seal is approximately equal to the first and second thicknesses.

14. The vehicular component according to claim 13, wherein the seal extends around a perimeter of the trim panel.

15. The vehicular component according to claim 1, wherein the trim panel extends at least partially across a door panel or a bolster.

16. The vehicular component according to claim 1, wherein the trim panel extends at least partially across a component selected from the group of a dashboard, an instrument panel, a center console, and a combination thereof.

17. The vehicular component according to claim 16, wherein the protective layer is selected from the group consisting of: thermoformed urethane and sprayed urethane.

18. The vehicular component according to claim 1, wherein the substrate layer includes acrylonitrile-butadiene-styrene.

19. The vehicular component according to claim 1, wherein the substrate layer is selected from the group consisting of: polypropylene and polycarbonate.

* * * * *